Patented July 11, 1944

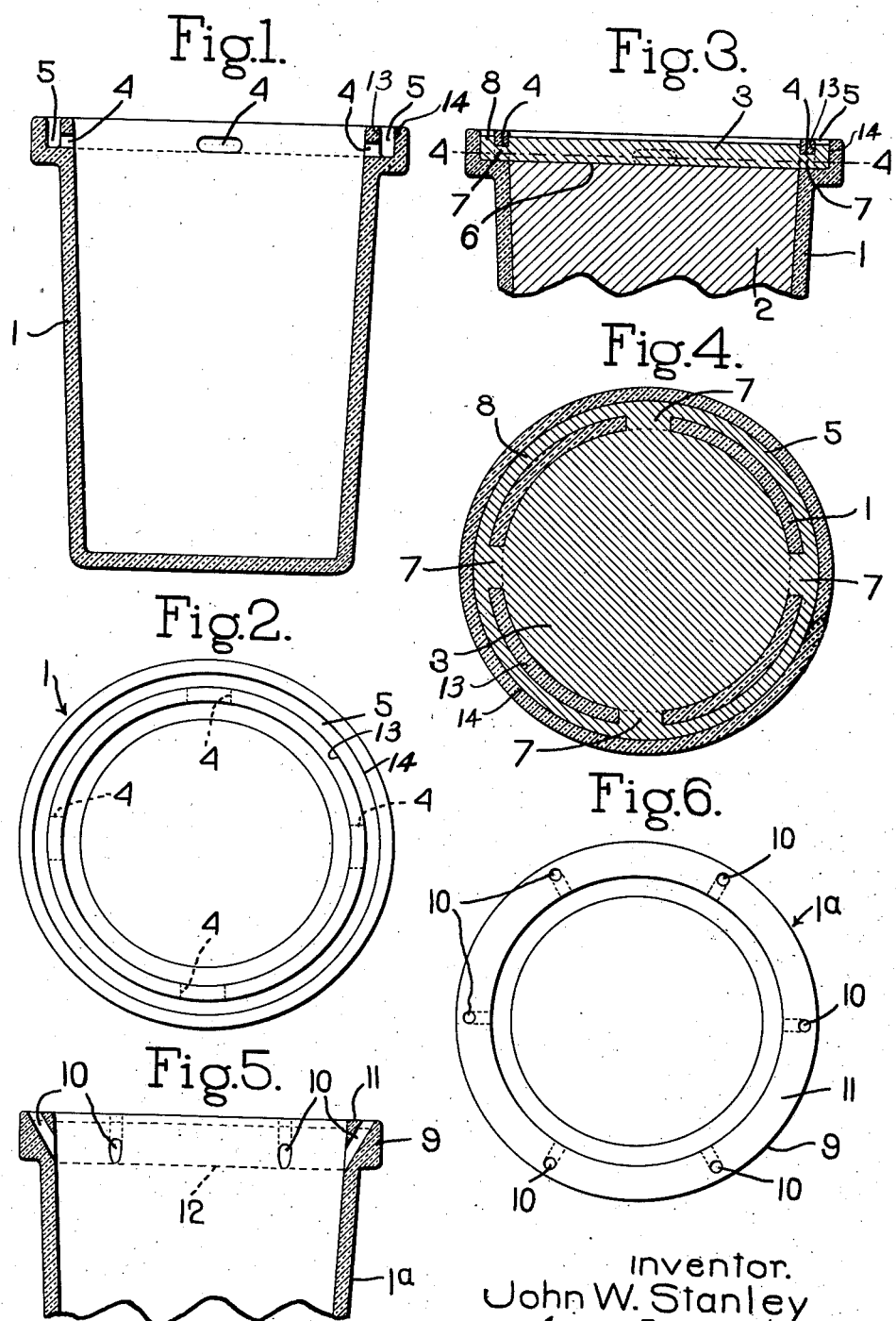

2,353,520

UNITED STATES PATENT OFFICE 2,353,520

JELLY GLASS

John W. Stanley, Needham, Mass.

Application March 7, 1942, Serial No. 433,742

3 Claims. (Cl. 215—80)

This invention relates to jelly glasses.

In putting up jelly in glasses, especially in the home, it is the common practice to fill the jelly glasses to the desired level with jelly and then to pour on top of the jelly melted paraffin or some other suitable sealing compound for the purpose of sealing the glass. This sealing compound adheres to the inner face of the sides of the glass and seals the jelly from contact with the air.

It sometimes happens that the layer of sealing compound breaks loose from the surrounding wall of the jelly glass, thereby breaking the seal and exposing the jelly to contact with air, a condition which often results in the jelly being spoiled.

One of the objects of my invention is to provide a jelly glass which is so constructed that, when the melted paraffin or other sealing material is poured on top of the jelly, such sealing material will become interlocked with the wall of the jelly glass and will thus be prevented from breaking loose from the wall.

In order to give an understanding of my invention, I have illustrated in the drawing some selected embodiments thereof, which will now be described, after which the novel features will be pointed out in the appended claims.

In the drawing,

Fig. 1 is a vertical sectional view through a jelly glass embodying my invention.

Fig. 2 is a top plan view of Fig. 1.

Fig. 3 is a fragmentary sectional view showing the glass illustrated in Fig. 1 filled with jelly and also showing the sealing layer interlocked with the wall of the glass.

Fig. 4 is a section on the line 4—4 of Fig. 3.

Fig. 5 is a fragmentary sectional view illustrating a different embodiment of the invention.

Fig. 6 is a top plan view of Fig. 5.

In the drawing, 1 indicates the jelly glass and in Fig. 3, 2 indicates the jelly with which the glass is filled and 3 indicates the layer of paraffin or other sealing compound which is poured on top of the jelly 2 to seal the glass.

In accordance with my invention, the wall of the glass is provided with recesses or apertures situated above the normal jelly level in the filled jelly glass but below the top level of the sealing layer so that, when the melted paraffin or other sealing material is poured onto the jelly, it will flow into such recesses or apertures, thereby providing anchoring portions which are integral with the layer but which are interlocked with the wall of the jelly glass.

In Figs. 1 to 4, these anchor-forming recesses or openings are shown at 4, and they extend through the wall of the jelly glass and are situated immediately above the jelly level of the jelly-filled glass.

In the construction shown in Figs. 1 to 4, the wall of the glass is thickened at its upper end, and the thickened portion is provided with an annular open-topped groove 5 with which the openings 4 communicate, said groove constituting an exterior overflow trough which surrounds the open end of the glass.

The two sides or walls 14 and 13 of the trough 5 are of the same height, and the outer wall 14 has a continuous unbroken outer face, while the inner wall 13 has the openings 4 located therein.

In using this jelly glass, it will be filled with jelly to the level indicated by the line 6 in Fig. 3, which is just below the anchor-forming openings 4, and then melted paraffin or other sealing material is poured on the top of the jelly to provide a sealing layer 3 of the desired thickness. The hot melted paraffin will readily flow into and through the apertures 4, and the surplus paraffin will flow into and be retained by the trough 5. When the paraffin cools, the sealing layer 3 will have a plurality of anchoring portions 7 which occupy the apertures 4 and which are integral with the layer 3. These anchoring portions are also integral with the portion 8 of the paraffin which flows into the trough 5. The sealing layer 3 is thus interlocked with the wall of the jelly glass through the medium of the anchoring portions 7, and by this means the layer 3 of sealing material will be firmly anchored to the jelly glass and will be prevented from breaking loose from the inner wall thereof.

In Figs. 5 and 6 I have illustrated a different embodiment of the invention wherein the anchor-forming openings are in the nature of apertures which extend from the top edge of the glass downwardly into the interior thereof, the lower end of said openings being situated just above the line to which the jelly glass is to be filled with jelly, so that when the glass is filled, the jelly level in the glass will be below said openings.

The jelly glass shown in Figs. 5 and 6 is indicated at 1a, and it has at its upper edge a thickened portion or rib 9. This rib is provided with a plurality of apertures 10 which extend from the top edge 11 thereof downwardly and inwardly and break through the inner face of the wall of the jelly glass at a point just above the level to which the jelly glass is to be filled, this being indicated by the line 12 in Fig. 5. In filling this type of jelly glass, the jelly will be poured into the glass until it is filled to the line 12, and then the melted paraffin or other sealing material is poured on top of the jelly. This melted paraffin flows into the apertures 10, and as the paraffin cools, the portions thereof which occupy the apertures constitute anchoring portions which interlock the sealing layer with the jelly glass.

Since the apertures 10 terminate at their upper ends at the upper edge 11 of the glass, the melted paraffin will not overflow the glass through these apertures 10 provided the upper level of the layer of paraffin is kept below the top edge of the glass. In both forms of my invention, the wall of the glass is thickened at its upper end, and the outer face of said thickened wall portion is unbroken and continuous, and said thickened portion has apertures in the inner part thereof which break through the inner face of the thickened portion but do not break through the outer face, said apertures being vented at their outer ends through the top edge of the thickened portion. In the construction shown in Figs. 1 to 4, this venting is accomplished through the groove 5 which is formed in said top edge, and in the construction shown in Figs. 5 and 6, the venting is accomplished by each aperture having its outer end breaking through the upper edge of the thickened portion.

It will thus be seen that I have provided a jelly glass which is so constructed that, when the melted paraffin or other sealing material is poured on top of the jelly, such layer becomes interlocked with the glass and thus is held firmly in position, making it impossible for the layer to break loose from the wall of the glass.

While I have herein illustrated my invention as applied to a jelly glass, yet it is to be understood that it is equally applicable to glasses in which jam, marmalade and other food products are packaged.

I claim:

1. A jelly glass having its wall thickened at its upper end and having an annular open-topped groove formed in said thickened wall portion, which groove constitutes an overflow trough and is of less depth than the vertical dimension of said thickened portion, the outer wall of the groove being imperforate and the inner wall having through openings situated flush with the bottom of the groove and immediately above the normal jelly level of the jelly-filled glass.

2. A jelly glass having an open top and a progressively decreasing inside diameter from the top to the bottom, said glass having at its top an exterior rib which forms a thickened wall portion, said glass being provided with apertures extending from the top edge of the thickened wall portion downwardly and inwardly into the interior of the glass, said apertures breaking through the inner wall of the glass at a point above the bottom of the rib and above the normal jelly level of the jelly-filled glass, whereby when the glass is filled with jelly and a sealing layer of paraffin is poured on top of the jelly the paraffin will flow into the openings and thereby form anchoring projections which interlock the sealing layer with the jelly glass.

3. A jelly glass having an open top and a progressively decreasing inside diameter from the top to the bottom, said glass having at its top an exterior rib which forms a thickened wall portion, the upper face of said rib being flush with the top edge of the glass and the outer face of the rib presenting a continuous and unbroken surface, said glass having anchor-forming openings which are located in said thickened wall portion and which break through the inner face of such thickened wall portion at a point above the bottom of the rib and above the normal jelly level of the jelly-filled glass, but which terminate at their outer ends inside of the outer face of said rib, the outer ends of said openings being opened to the atmosphere through the upper edge of said rib, whereby when the glass is filled with jelly to its normal jelly level and a sealing layer of paraffin is poured on top of the jelly, the paraffin will flow into the openings and thereby form anchoring projections which anchor the sealing layer to the glass.

JOHN W. STANLEY.